(12) United States Patent
Nakao et al.

(10) Patent No.: US 7,564,520 B2
(45) Date of Patent: Jul. 21, 2009

(54) LIQUID CRYSTAL DISPLAY DEVICE

(75) Inventors: Kenji Nakao, Kanazawa (JP); Tetsuya Kojima, Ishikawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 207 days.

(21) Appl. No.: 11/777,548

(22) Filed: Jul. 13, 2007

(65) Prior Publication Data

US 2008/0018837 A1   Jan. 24, 2008

(30) Foreign Application Priority Data

Jul. 18, 2006   (JP) .............................. 2006-195860
Jul. 5, 2007    (JP) .............................. 2007-177335

(51) Int. Cl.
  *G02F 1/1335*   (2006.01)
  *G02F 1/1337*   (2006.01)
(52) U.S. Cl. .................. 349/108; 349/106; 349/126
(58) Field of Classification Search ................. 349/104, 349/106, 107, 108, 109, 110, 123, 126

See application file for complete search history.

(56) References Cited

U.S. PATENT DOCUMENTS 7,212,259 B2 * 5/2007 Hsu ........................... 349/106
2003/0147026 A1 * 8/2003 Wachi ........................ 349/106

FOREIGN PATENT DOCUMENTS

JP           8-262423      10/1996

OTHER PUBLICATIONS

Hiroyuki Mori, et al., "A Wide-Viewing-angle π cell compensated with discotic film", The Institute of Electronics Technical Report of IEICE, 1999, pp. 199-204, and end page (with English Abstract).
Nikkei FPD flat-panel display, 2005, p. 110-113.

* cited by examiner

*Primary Examiner*—Hemang Sanghavi
(74) *Attorney, Agent, or Firm*—Oblon, Spivak, McClelland, Maier & Neustadt, P.C.

(57) ABSTRACT

In the optically compensated bend (OCB) type liquid crystal display device comprises a substrate 20 having a plurality of stripe-like color filters in a plurality of different colors from one another aligned in parallel with and spaced apart from each other on the substrate, a transparent electrode deposited on the color filter and an orientation film deposited on the transparent electrode, the orientation film being treated with an orientation process in a direction along a longitudinal direction of the stripe of the stripe-like color filter, and rugged portions on an edge of the color filters adjacent to each other.

6 Claims, 6 Drawing Sheets

LIQUID CRYSTAL DISPLAY DEVICE

CROSS-REFERENCE TO RELATED APPLICATIONS

This application is based upon and claims the benefit of priority from the prior Japanese Patent Applications No. 2006-195860, filed on Jul. 18, 2006 and No. 2007-177335, filed on Jul. 5, 2007; the entire contents of which are incorporated herein by reference.

BACKGROUND OF THE INVENTION

The present invention relates to an optically compensated bend (OCB) liquid crystal display device used for the display of liquid crystal display televisions, liquid crystal display monitors, etc.

In regard to liquid crystal display devices, though the twisted nematic (TN) type liquid crystal display device has been generally used so far, the OCB type display device has been studied as a liquid crystal display device characterized in higher response (Refer to Bulletin 'SHINGAKUGIHOU' EDI98-144, page 199; Institute of Telecommunications Engineers, NIKKEI FLAT PANEL DISPLAY, Strategy Edition 2005, page 110).

The liquid crystal is interposed between two substrates in the OCB type crystal display device, and transparent electrodes are formed on these substrates as the voltage supplying means. On the condition before a power source is turned on, the alignment state of the liquid crystal is the state called 'spray alignment'. When the power source is turned on, a relatively high voltage is applied to the voltage supplying means for a short time so as to transfer the alignment of the liquid crystal to the bend alignment state. It is a feature of the OCB type liquid crystal display mode that the display is carried out by means of the bend alignment state.

An aspect of the alignment of the liquid crystal will be explained by the aid of FIG. 6. As shown in FIG. 6A, liquid crystal molecules 53 of a liquid crystal layer are in the spray alignment state when the voltage V between a pixel electrode 51 and a counter electrode 52 supplied from a power source 50 is zero. Directions of orientation for upper and lower substrates 55 and 54 are the same, i.e. the parallel direction as shown by the arrows 56 and 57. Next, upon supplying a predetermined voltage, e.g. a high voltage of several ten volts between both the electrodes, the state of molecules shifts to the bend alignment state where liquid crystal molecules at the center of the liquid crystal layer stand up perpendicularly like FIG. 6B. When the voltage that can keep the liquid crystal molecules of FIG. 6B being in the bend alignment state is called 'the counterbalanced voltage $V_C$', the spray alignment state is stabilized at any voltage not higher than this voltage $V_C$. In the OCB operation, a voltage higher than the counterbalanced voltage $V_C$ (off-voltage) at which the bend alignment state is kept steady is applied to the liquid crystal molecules as shown in FIG. 6B. Upon changing the voltage between the off-voltage and an on-voltage $V_{ON}$ higher than $V_C$, the state of inclination of the liquid crystal molecules is changed between FIG. 6B and FIG. 6C so that the retardation value of the liquid crystal layer may be changed in order to control the transmittance in combination with polarization films 58 and 59. In addition, there is an example in which a voltage higher than $V_C$ is periodically supplied, i.e. the black insertion drive is carried out.

On the condition that the direction perpendicular to the paper surface is the horizontal surface viewed from the direction of the arrow 60 on the paper surface, observation indicates that alignment of the liquid crystal molecules is in a symmetrical relationship with respect to the horizontal direction, so that display thereof has relatively balanced visibility in the longitudinal direction. To this end, it is considered that the orientation directions 56 and 57 of both the substrates are conformed together in the vertical direction of the display surface in the case of the OCB type display.

The orientation process of the liquid crystal display device is carried out upon executing a rubbing process to the orientation film. In the OCB type liquid crystal display device, color filters disposed on the counter substrate are stripe-like extending in the direction perpendicular to the display surface. Red, green and blue stripe filters constituting one unit are sequentially aligned in parallel with each other in the horizontal direction. The counter electrode and the orientation film are deposited on the filters.

However, there is a problem in operation of the display device that transition from the spray alignment to the bend alignment is not surely executed due to the orientation film of the counter substrate side, so that the spray alignment having remained as it is looks like a luminescent spot defect.

BRIEF SUMMARY OF THE INVENTION

The present invention is intended to provide an OCB type liquid crystal display device that can assure the transition from the spray alignment to the bend alignment.

The aspect of the present invention is represented by the optically compensated bend (OCB) type liquid crystal display device that comprises a substrate having a plurality of stripe-like color filters in a plurality of different colors from one another aligned on the substrate in parallel with each other, a transparent electrode deposited on the color filter and an orientation film deposited on the transparent electrode, the orientation film being treated with an orientation process in a direction along the longitudinal direction of the stripe of the stripe-like color filter, and the display device is characteristically provided with a rugged portion on an edge of the color filters adjacent to each other.

Upon ensuring transition from the spray alignment to the bend alignment, the luminescent spot defect caused by the spray alignment having remained can be avoided.

DETAILED DESCRIPTION OF THE INVENTION

Figure 1:
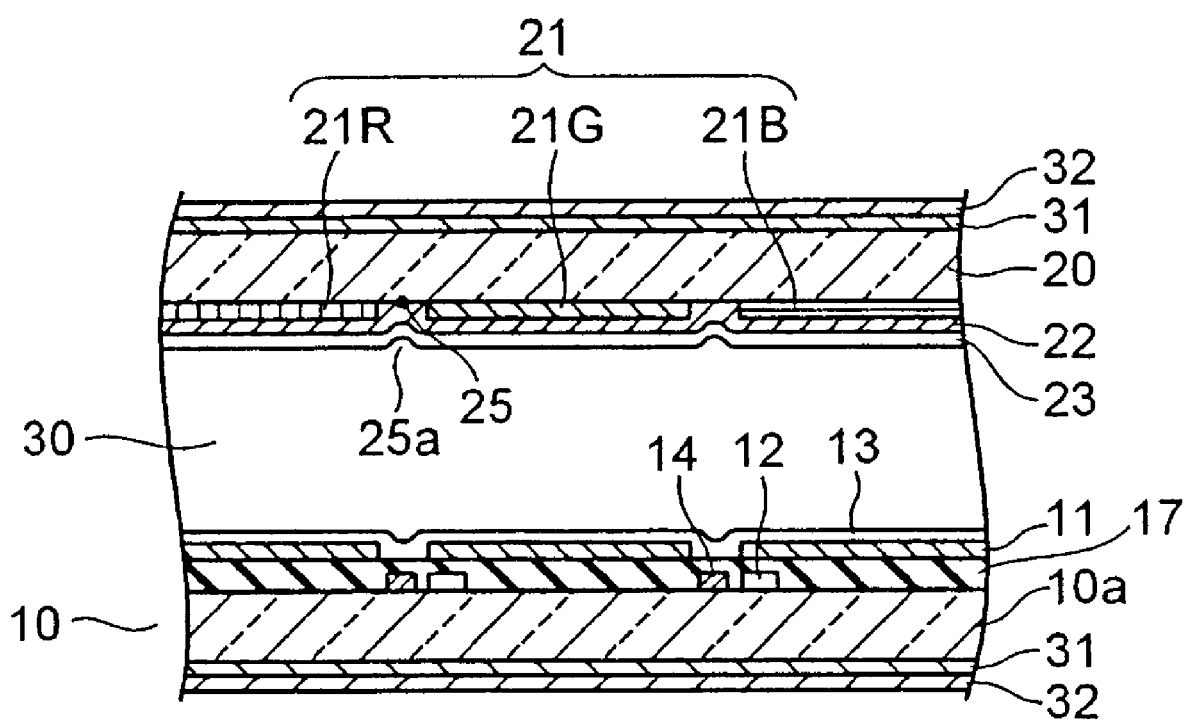
FIG. 1 is a schematic cross sectional view of an embodiment of the present invention.

Referring to the drawings, a display device of an embodiment of the present invention will be explained hereinafter. The inventors of the present invention have focused attention on that the remaining phenomenon of the spray alignment is concerned with a minute groove pattern of the orientation film formed between stripe filters. As a result of the study achieved, we have found that fibers of the rubbing cloth do not touch the periphery of this groove so sufficiently that they rub non-uniformly the surface of the orientation film in the orientation process.

The OCB type liquid crystal display device of this embodiment is basically configured by executing rubbing process on the upper and lower substrates in parallel i.e. in the same direction.

Figure 2:
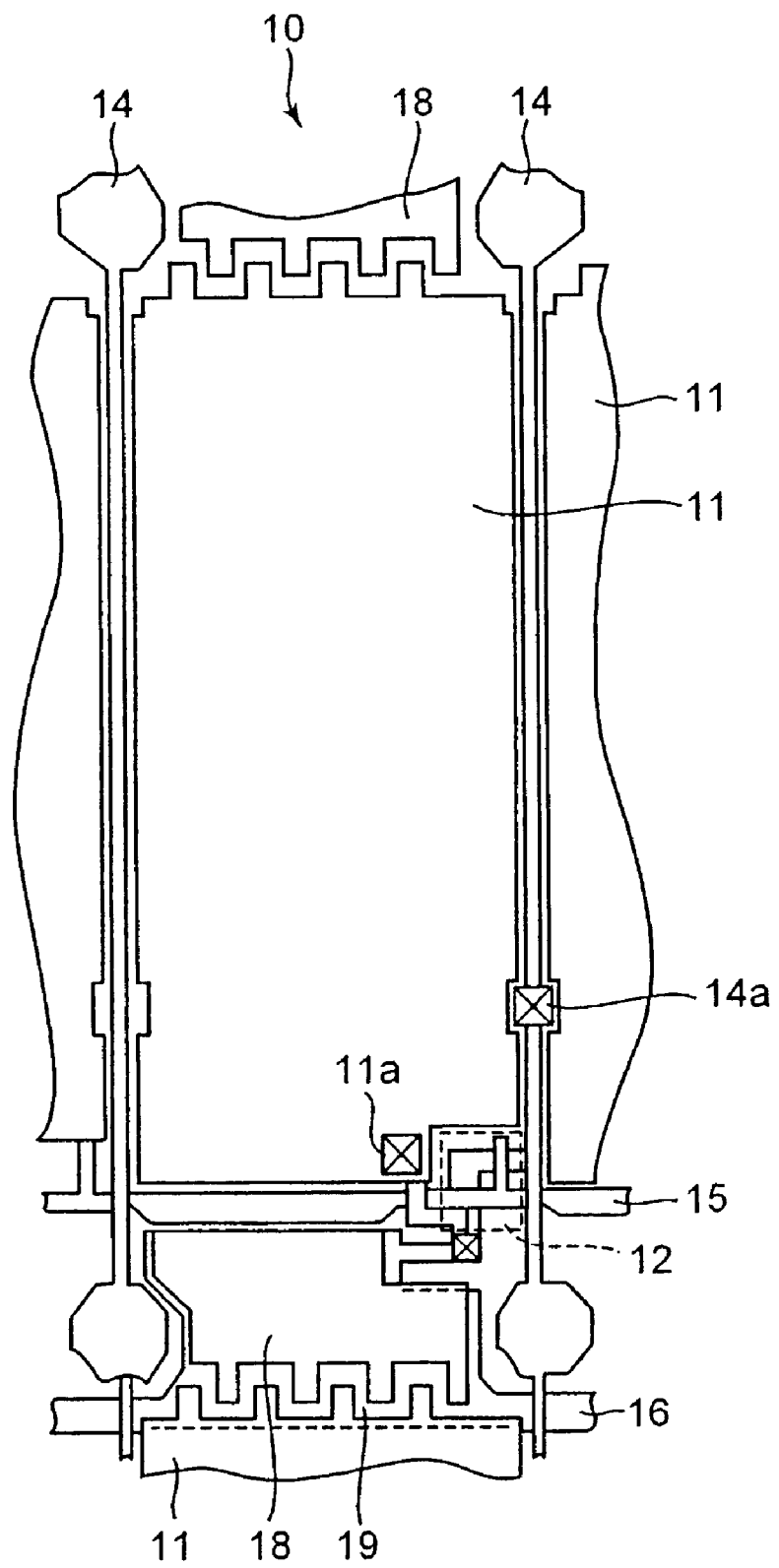
FIG. 2 is a schematic plan view of the array substrate of an embodiment of the present invention.
Figure 3:
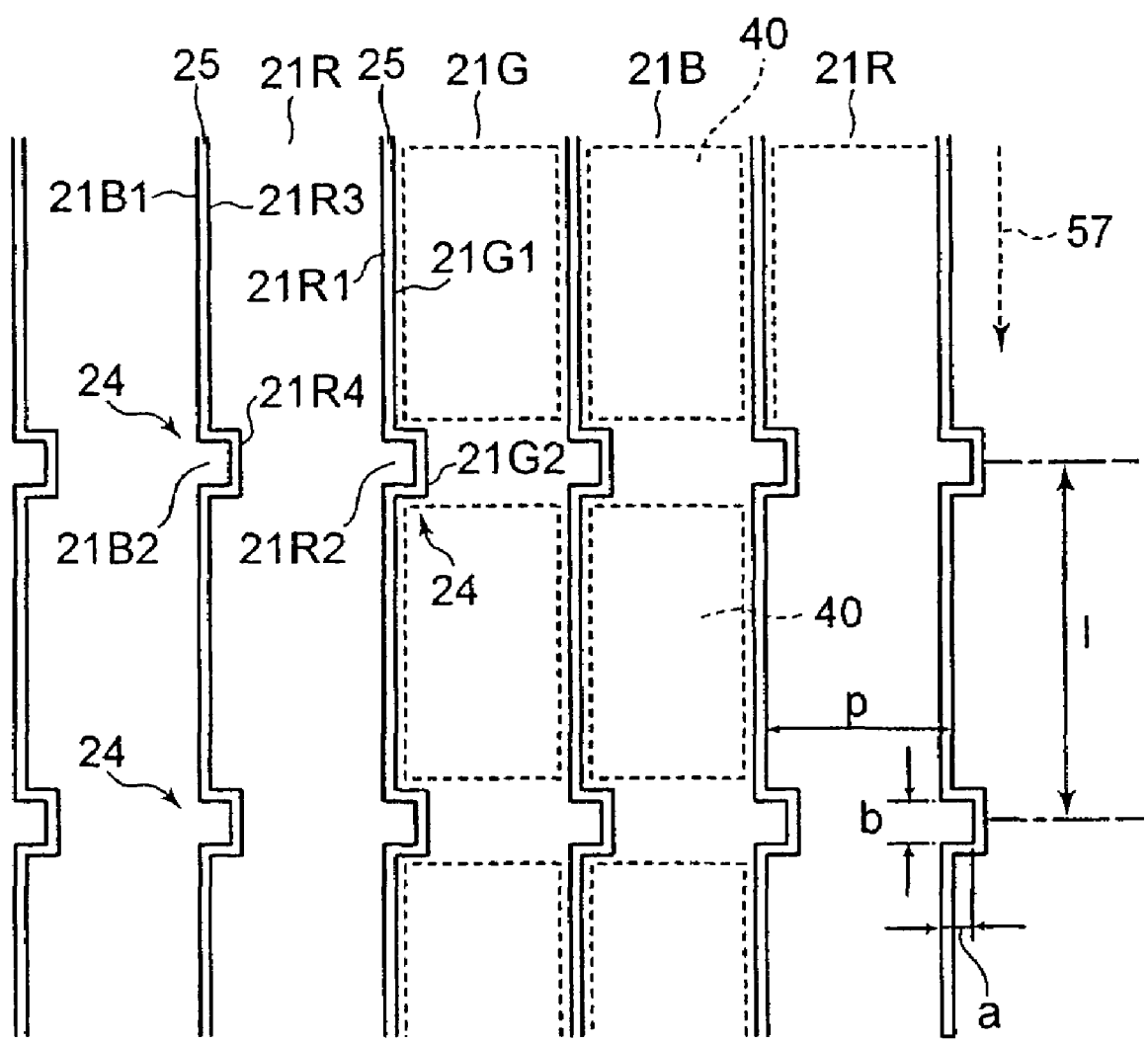
FIG. 3 is a schematic plan view explaining the counter substrate of an embodiment of the present invention.

As shown in FIGS. 1 to 3, a liquid crystal panel constituting the OCB type liquid crystal display device has a configuration in which a liquid crystal layer 30 is interposed between an array substrate 10 and a counter substrate 20. A pixel electrode 11 is disposed on the array substrate 10. A signal line 14 and a scanning line 15 are disposed so as to surround these pixel electrodes 11 in a matrix arrangement, and a switching TFT 12 is disposed at each intersection of these lines. In addition, an orientation film 13 of such as polyimide is coated and laminated on the pixel electrode 11.

In more detail, the array substrate has a transparent glass substrate 10a. A plurality of signal lines 14 and a plurality of scanning lines 15 are disposed on or over the transparent glass substrate interposed by an inter-layer insulating film 17 of silicon oxide film as shown in FIG. 1 and FIG. 2. Furthermore, an auxiliary capacitance line 16 fabricated in the same process as that for the scanning line 15 is disposed in parallel with the scanning line 15.

A thin film transistor (TFT) 12 having a polycrystalline silicon film acting as the active layer and a pixel electrode 11 of a transparent conductive film on the inter-layer insulating film 17 are disposed in the vicinity of the intersection of the signal line 14 and the scanning line 15. The drain region of the TFT 12 is connected to the signal line 14 through the contact hole 14a, and the source region thereof is connected to the pixel electrode 11 through the contact hole 11a.

In addition, the source region of the TFT 12 is connected to the auxiliary capacitor electrode 16. The pixel electrode 18 for phase transition, which is fabricated in the same process as that for the pixel electrode 11, is located over the auxiliary capacitor electrode 16 under the condition of insulation.

Furthermore, the pixel electrode 11 for display on the next horizontal line and the pixel electrode 18 for phase transition, which are adjacent to each other on the auxiliary capacitor electrode 16, are configured to be a comb-shaped structure 19 in which face-to-face edge sides thereof engage with each other. Thereby, a core of bend can be formed uniformly upon applying a twisted transversal field between the pixel electrode 11 and the pixel electrode 18 for phase transition. As shown in FIG. 6, the initial spray alignment state can therefore be uniformly led to the bend alignment state.

As shown in FIGS. 1 and 3, the counter substrate 20 is provided with a color filter 21 having stripe-like color filters in red 21R, green 21G and blue 21B respectively disposed sequentially in parallel with one another. A transparent counter electrode 22 and an orientation film 23 are additionally laminated on this color filter 21. On the outside of both substrates 10 and 20, a phase difference film 31 and a polarizing plate 32 are stuck. In addition, e.g. a backlight (not shown) is disposed on the rear surface side of the array substrate 10.

In FIG. 3, the pattern of the color filter 21 on the counter substrate is that the respective color stripe filters 21R, 21G and 21B are elongated in parallel with the direction vertical to the display surface of the liquid crystal panel. A picture element region (or a pixel region) 40 of one pixel is aligned face to face with the pixel electrode along the same stripe in the respective stripe filters. In this embodiment, the pitch p of the pixel region 40 in the horizontal direction is e.g. 100 μm and the pitch l thereof in the vertical direction is e.g. 300 μm. Thus, a group (trio) of the pixel regions comprised of red, green and blue pixels adjacent to each other in the horizontal direction forms one picture element (or one pixel). These groups are sequentially arranged in parallel in the horizontal direction. One stripe filter (e.g. 21R) and another stripe filter (e.g. 21G) adjacent thereto are isolated from each other with a predetermined distance. Besides, rugged portions 24 corresponding to each pixel electrode region are formed on the edge of each filter of these neighboring stripe filters (e.g. 21R and 21G).

In FIG. 3, a portion of one side of one stripe filter, for example, the right side boundary edge 21R1 in the figure of the red filter 21R is projected for every pixel region 40 so as to make a convex rugged portion 21R2. Corresponding to this convex rugged portion, the left side boundary edge 21G1 of the adjacent green stripe filter 21G is dented so as to make a concave rugged portion 21G2. Then, the rugged portion 24 is formed by inserting the convex rugged portion 21R2 of the red filter into the concave rugged portion 21G2. Borders between neighboring filters are in non-contact condition through a gap portion 23.

Furthermore, a portion of the edge of the other side i.e. the left side boundary edge 21R3 in the figure of the red filter 21R is dented for every pixel region 40 so as to make a concave rugged portion 21R4. Corresponding to this concave rugged portion, the right side boundary edge 21B1 of the adjacent blue stripe filter 21B is projected so as to make a convex rugged portion 21B2. Then, the rugged portion 24 is formed by inserting the convex rugged portion 21B2 of the blue filter into the concave rugged portion 21R4 of the red filter. The stripe filters 21G and 21B in other colors are formed in the same pattern. Therefore, the gap portion 22 is not a straight line but forms a rugged portion. This uneven or rugged portion is disposed between respective pixel regions 40. For instance, the length a of projection of the convex rugged portion in the horizontal direction is 5 to 10 μm, and the width b in the vertical direction along the edge is 15 to 20 μm. Though the rugged portion is provided among the edges of respective color stripe filters for every horizontal pixel line in this embodiment, it can be provided for every plural horizontal lines. However, it is desirable that the rugged portion should be provided every horizontal line in order to obtain sure transition. In addition, the rugged portion is provided among all the edges of respective color stripe filters in the direction of the horizontal pixel line in this embodiment, but the rugged portion may be provided on, for example, any one of the neighboring color filters of red, blue and green. However, in order to obtain sure transition, it is desirable to provide the rugged portion on any one of the neighboring color filters of red, blue and green, and is more preferable to provide it on every color filter.

Figure 6C:
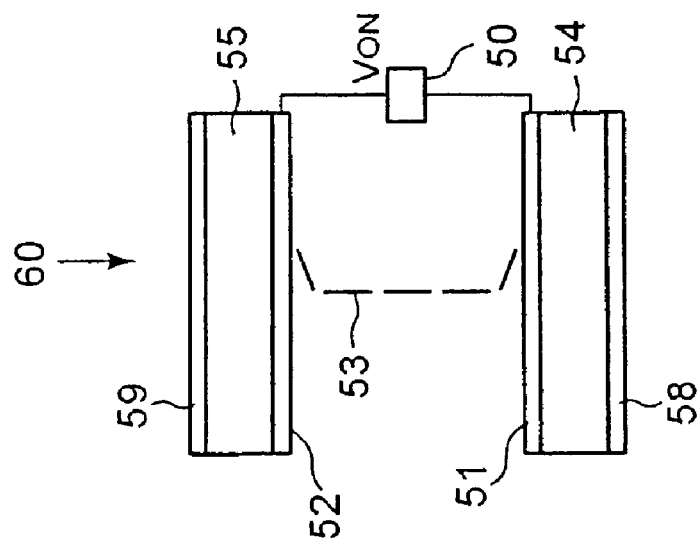
FIGS. 6A through 6C are diagrams explaining the OCB liquid crystal display device.
Figure 6B:
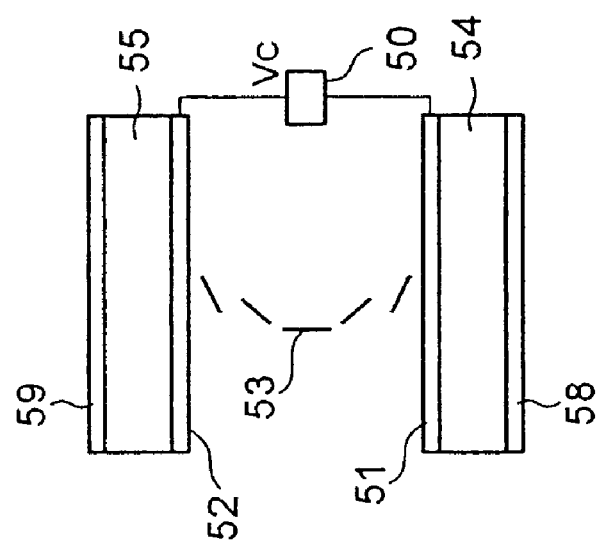
Figure 6A:
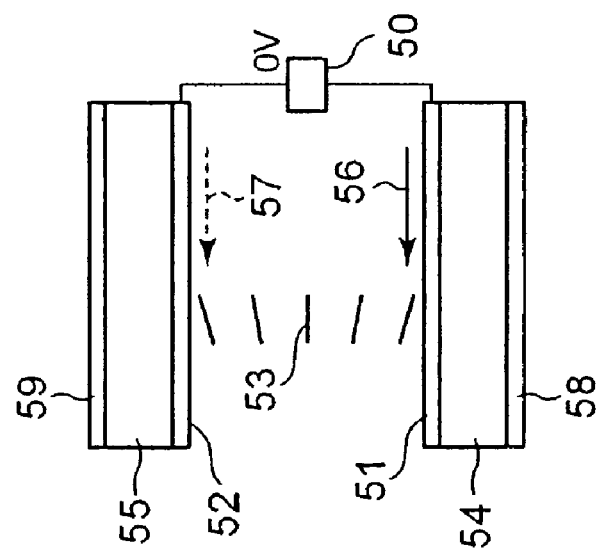

The direction of orientation for the liquid crystal layer 30 is the same as the longitudinal direction of the stripe filter i.e. the vertical direction as shown by the arrow 57, and the orientation process in the same direction by rubbing is also executed for the array substrate so that the parallel orientation can be performed as shown in FIGS. 6A to 6C.

This liquid crystal panel is in the state of spray alignment in which liquid crystal molecules are arranged substantially in parallel with each other when the initial voltage is not applied (FIG. 6A). As for the orientation film, an orientation film having a high pre-tilt, preferably four degrees or more, is employed. In this embodiment, the orientation film of $7°±2°$ was used. If the pre-tilt is small, the bend alignment state cannot be kept stably and, as a result, the spray alignment state may remain in some cases.

The alignment state of the liquid crystal is transferred into the bend alignment state, which is used for display (FIG. 6B). A relatively high transition voltage, e.g. about 25 volts was applied to the liquid crystal layer in order to carry out this transition.

As mentioned above, the OCB type liquid crystal display device comprises the substrates and the liquid crystal, and performs display by applying a voltage to the liquid crystal. The zero-voltage alignment state when the voltage is not applied to the liquid crystal is different from the display alignment state in which display is performed. The zero-voltage alignment state is transferred into the display alignment state upon applying a transition voltage. In order to display, a voltage between the counterbalanced voltage $V_C$ of both these modes and the voltage $V_{ON}$ (FIG. 6C) higher than $V_C$ is applied thereto, and the display device is used with the bend alignment state.

In accordance with this embodiment, no remaining of the spray alignment was generated when the spray alignment was transferred into the bend alignment upon supplying a voltage between the electrodes.

Figure 7:
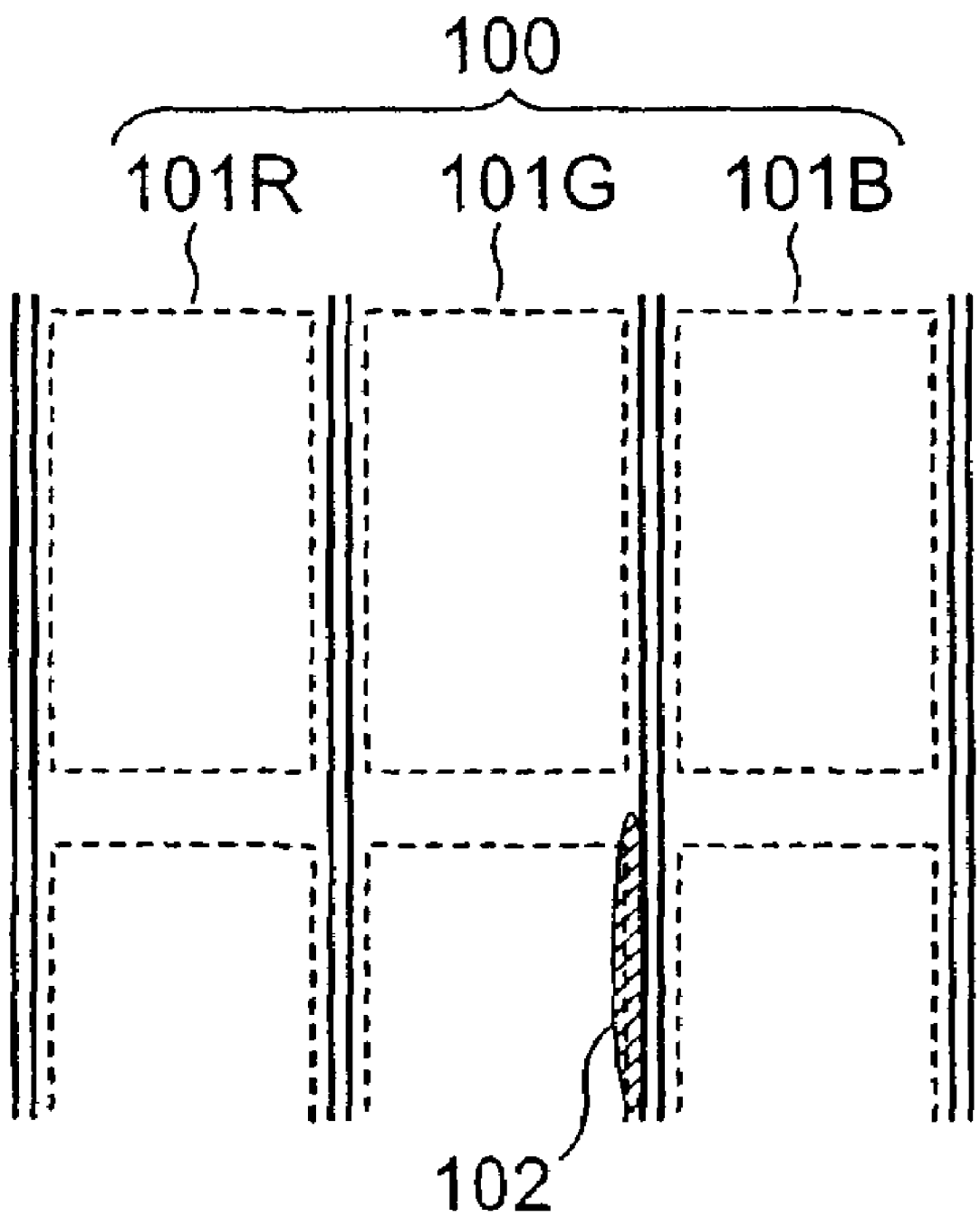
FIG. 7 is a plan view explaining the color stripe filter of a conventional device.

On the other hand, defect panels having the spray alignment 102 remaining at the edge of color filter have taken place by about 1 percent in the case of the OCB type liquid crystal panels employing a conventional color filter having linear stripe-like color filters 101R, 101G and 101B with no rugged portions as shown in FIG. 7.

Figure 4:
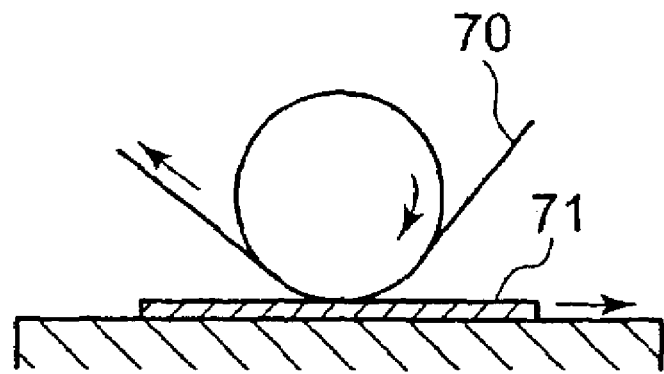
FIG. 4 is a diagram explaining rubbing of the present invention.

The cause thereof can be thought as follows. As shown in FIG. 4, rubbing is a process in which the orientation film on the substrate 71 is rubbed with a cloth 70 having strings of cotton or rayon of about 20 micrometers in diameter implanted densely. The direction of rubbing is in agreement with the direction of the stripe of color filter, and the widths of the gap portions, that is a space between edges of the stripes 25 of the color filter are 10 to 20 micrometers, approximately equal to each other, and the periphery of the gap portion 25 is tilted. As shown in FIG. 1, the gap portion 25 of the filter is like a tilted groove. The counter electrode 22 and the orientation film 23 on the over layer of the gap are so affected by the unevenness thereof that a similar tilted groove 25a is generated in the orientation film surface. In consequence, rubbing strength on the edge portion of the color filter is presumably weakened because the implanted strings intrude into the gap 25, but do not get to the bottom portion. When the rubbing strength is weakened, the pre-tilt becomes low and then the bend alignment state cannot be presumably maintained stably.

The present invention is therefore configured that the rugged portions are provided in the middle of the pattern edge of respective color stripe filter layers of the color filter so that the stripe groove can be extended intermittently. Upon making the pattern edge of the neighboring respective color stripe filter layers be not linear but non-linear like this, no orientation defect regions are generated on the same line. In more detail, because the orientation film on the rugged portion is sufficiently rubbed, it acts as a seed by which the initial spray alignment is transferred to the bend alignment state. Therefore, even though a region where the alignment is insufficient has existed in the vicinity of the rugged portion, transferring to the bend alignment state is possible by the influence of the liquid crystal disposed on the rugged portion. As a result, transition is surely carried out. In order to carry out the orientation process without fail as mentioned above, it is desirable that the length a of projection be 5 µm or more, and the width b along the edge in the vertical direction be 15 µm or more.

Figure 5:
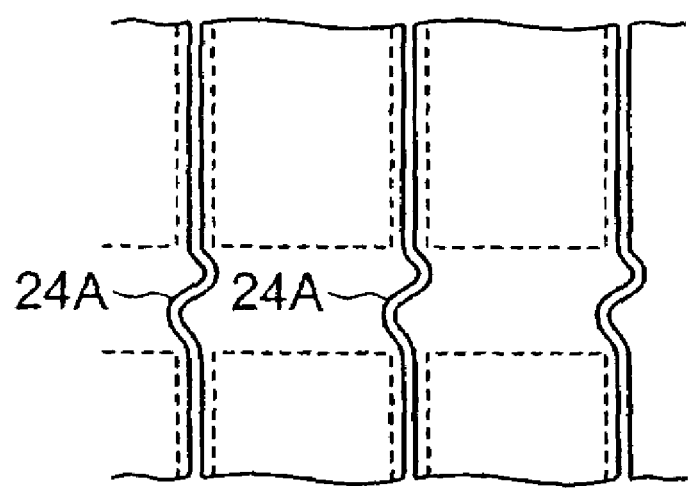
FIG. 5 is a schematic plan view explaining another embodiment of the present invention.

As shown in FIG. 5, the rugged portion 24 is not formed in a rectangular-shape as the rugged portion mentioned above, but a portion of the filter edge may be formed in a bent or zigzag pattern 24A such as S-letter in order to prevent rubbing condition of the rubbing cloth fiber from being affected by the groove.

A pillar spacer can be formed on the rugged portion of the color filter of the present invention. Furthermore, the pillar spacer is not necessarily formed for all colors. On the contrary, needless to say, the pillar spacer can be formed for all colors with no restriction. In this embodiment, an example in which a rugged portion is also provided on the color filter without a pillar spacer was explained.

Though the embodiment mentioned above has a structure in which a light absorbing layer is not provided, it also can be applicable to a structure in which a light absorbing layer is provided as the black matrix. When the light absorbing layer is inserted between the stripe-like color filters, a step on the edge is generated because of the difference of layer thickness between the filter and the light absorbing layer, so that a spray distortion like the one in the embodiment mentioned above may remain. Upon forming a rugged portion, the rubbing process is made smooth and remaining of the spray distortion can be prevented.

In this embodiment, the three-color combination in red, green and blue was explained as a plurality of color filters, but it especially is not limited to this combination. For example, a combination of e.g. yellow, magenta and cyan can be utilized, and number of colors is not restricted to three.

Moreover, the present invention is not confined to the transparent type, but the same effect can be obtained with respect to the transreflective type or the reflective type. In addition, as far as it is contained in the scope where the specific effects of the present invention can be obtained, the configuration thereof can appropriately be changed.

What is claimed is:

1. An optically compensated bend (OCB) type liquid crystal display device comprising:
    a substrate having
        a plurality of stripe-like color filters in a plurality of different colors from one another aligned thereon in parallel with each other,
        a transparent electrode deposited on the color filter; and
        an orientation film deposited on the transparent electrode, the orientation film being rubbed with an orientation process in a longitudinal direction of the stripe of the stripe-like color filter;
    wherein a rugged portion is provided on one part of an edge of the color filters adjacent to each other.

2. The OCB type liquid crystal display device as set forth in claim 1, wherein the stripe-like color filters in a plurality of different colors are positioned in parallel with each other, and each edge thereof is spaced apart from other one.

3. The OCB type liquid crystal display device as set forth in claim 1 or 2, wherein the stripe-like color filters include a convex rugged portion formed on an edge at one side thereof and a concave rugged portion formed on an edge at another side thereof, and the rugged portion is configured with the concave rugged portion of the stripe-like color filter and the convex rugged portion, which is fitted in the concave rugged portion of the stripe-like color filter through a gap portion, of the adjacent stripe-like color filter.

4. The OCB type liquid crystal display device as set forth in claim 1 or 2, wherein the substrate is a counter substrate having the transparent electrode as a counter electrode, and a liquid crystal layer transferring between a spray alignment state and a bend alignment state is interposed between the counter substrate and an array substrate having a pixel electrode corresponding to each pixel region.

5. The OCB type liquid crystal display device as set forth in claim 1 or 2, wherein the rugged portion is provided for each pixel region.

6. The OCB type liquid crystal display device as set forth in claim 1 or 2, wherein the rugged portion is formed in a zigzag pattern.

* * * * *